United States Patent
Fukuda et al.

(10) Patent No.: US 8,568,833 B2
(45) Date of Patent: Oct. 29, 2013

(54) PROCESS FOR FORMATION OF MULTI-LAYERED COATING FILM

(75) Inventors: Tohru Fukuda, Kanagawa (JP); Keisuke Sai, Kanagawa (JP); Remi Kasai, Kanagawa (JP)

(73) Assignee: Kansai Paint Co., Ltd., Hyogo (JP)

( * ) Notice: Subject to any disclaimer, the term of this patent is extended or adjusted under 35 U.S.C. 154(b) by 12 days.

(21) Appl. No.: 13/498,880

(22) PCT Filed: Sep. 27, 2010

(86) PCT No.: PCT/JP2010/066713
§ 371 (c)(1),
(2), (4) Date: Mar. 28, 2012

(87) PCT Pub. No.: WO2011/040374
PCT Pub. Date: Apr. 7, 2011

(65) Prior Publication Data
US 2012/0183796 A1   Jul. 19, 2012

(30) Foreign Application Priority Data

Sep. 29, 2009   (JP) ................................ 2009-225632

(51) Int. Cl.
| | | |
|---|---|---|
| *B05D 1/36* | (2006.01) | |
| *B05D 7/24* | (2006.01) | |
| *B05D 7/26* | (2006.01) | |
| *B05D 7/00* | (2006.01) | |

(52) U.S. Cl.
CPC .. *B05D 1/36* (2013.01); *B05D 7/26* (2013.01); *B05D 7/50* (2013.01); *B05D 7/5723* (2013.01)
USPC ..................... 427/407.1; 427/409; 427/412.1; 427/384

(58) Field of Classification Search
CPC ............. B05D 1/36; B05D 3/02; B05D 7/14; B05D 7/16; B05D 7/50; B05D 7/56; B05D 7/57; B05D 7/572; B05D 7/26; B05D 7/5723
USPC ............ 427/407.1, 409, 412.1, 412.3–412.5, 427/372.2, 384, 388.1, 388.5; 428/411.1–704
See application file for complete search history.

(56) References Cited

U.S. PATENT DOCUMENTS

| | | | | |
|---|---|---|---|---|
| 5,814,410 | A  * | 9/1998 | Singer et al. ................ | 428/423.1 |
| 7,531,074 | B2 * | 5/2009 | Purdy et al. .................... | 204/488 |
| 8,034,877 | B2 * | 10/2011 | Adachi et al. ................. | 525/124 |
| 2004/0086658 | A1 * | 5/2004 | Onoyama et al. ............. | 427/458 |
| 2009/0087667 | A1 * | 4/2009 | Tomizaki et al. ............. | 428/413 |

FOREIGN PATENT DOCUMENTS

| | | |
|---|---|---|
| JP | 10-216617 | 8/1998 |
| JP | 2002-153807 | 5/2002 |
| JP | 2003-211085 | 7/2003 |
| JP | 2007-075791 | 3/2007 |
| JP | 2008-189748 A * | 8/2008 |

OTHER PUBLICATIONS

International Search Report in PCT/JP2010/066713 dated Dec. 7, 2010.
Cytec Industries Inc.—Cymel®: Amino Resin Crosslinkers for the Coating Industry: Product and Application Guide (2008).

* cited by examiner

*Primary Examiner* — William Phillip Fletcher, III
(74) *Attorney, Agent, or Firm* — Foley & Lardner LLP

(57) ABSTRACT

There is provided a process for formation of a multi-layered coating film, which includes sequentially coating a first colored coating composition, a second colored coating composition and a clear coating composition (C), and simultaneously heating and curing the obtained first colored coating film, second colored coating film and clear coating film to form a multi-layered coating film, where the first colored coating composition contains (a1) a polyester resin containing a hydroxyl group, which contains 1.0-8.0 mol/kg (resin solid content) of a straight-chain alkylene group having a carbon number of 4 or more in the molecule, has a hydroxyl group value in a range of 30-160 mgKOH/g and has a number-average molecular weight in a range of 1,000-6,000, and (a2) a melamine resin; and the colored coating composition contains (b1) an acrylic resin containing a hydroxyl group, which has a hydroxyl group value in a range of 40-200 mgKOH/g and has a weight-average molecular weight in a range of 3,000-15,000, (b2) a melamine resin having a content rate of a mononuclear melamine of 40 mass % or more, and (b3) an acid catalyst.

8 Claims, No Drawings

PROCESS FOR FORMATION OF MULTI-LAYERED COATING FILM

TECHNICAL FIELD

The present invention relates to a process for formation of a multi-layered coating film having an excellent chipping resistance and appearance.

BACKGROUND ART

As a process for forming a coating film for an automobile body, a process where an electrodeposited film is formed on an object to be coated and a coating film is then formed in accordance with three-coat and two-bake (3C2B) process including coating of an intermediate coating composition→baking and curing→coating of a base coating composition→coating of a clear coating composition→baking and curing has been widely adopted. Recently, in terms of energy-saving, etc., a process where the step of baking and curing after coating an intermediate coating composition is omitted, and an electrodeposited film is formed on an object to be coated and a multi-layered coating film is then formed in accordance with three-coat and one-bake (3C1B) process including coating of an intermediate coating composition→coating of a base coating composition→coating of a clear coating composition→baking and curing has been attempted (for example, Patent Document 1).

However, in the aforementioned 3C1B process, since a mixed layer of the intermediate coating film and a base coating film is apt to be generated, the smoothness and the chipping resistance of the obtained coating film are lowered, causing a problem.

As its countermeasure, for example, in Patent Document 1, it is described that in the aforementioned 3C1B process, when a coating composition containing (A) a vinylic copolymer that includes a specific amount of a specific structure unit, has a hydroxyl group value of 60-200 mgKOH/g and has a number-average molecular weight of 2,000-6,000, (B) a polyester resin that has a hydroxyl group value of 80-120 mgKOH/g and a number-average molecular weight of 1,500-2,600, (C) a nonaqueous polymer dispersion, and (D) one or more crosslinkable resins selected from the group consisting of an alkyl etherified melamine resin and blocked polyisocyanate resin is used as a thermosetting intermediate coating composition, film performances such as appearance, chipping resistance, adhesion, and weather resistance are not lowered.

In addition, in Patent Document 2, it is described that in the aforementioned 3C1B process, when a coating composition containing (a) 40-56 wt % of a urethane-modified polyester resin with a number-average molecular weight of 1,500-3,000, that is obtained by reacting a polyester resin containing a hydroxyl group, which is obtained by the polycondensation of an acid component containing 80 mol % or more of isophthalic acid and a polyhydric alcohol and has a glass transition point (Tg) of 40-80° C., and an aliphatic diisocyanate compound, (b) 10-30 wt % of a melamine resin, (c) 15-30 wt % of an isocyanate compound in which hexamethylene diisocyanate and an isocyanate compound, which is obtained by reacting hexamethylene diisocyanate with a compound reactive thereto, are blocked by a compound having an active methylene group, (d) 4-15 wt % of a nonaqueous dispersion resin having a core-shell structure (the amounts of (a)-(d) are based on the solid content weight of the coating resin), and (e) 0.4-2 parts by weight of a flat pigment with a major diameter of 1-10 μm and a number-average particle diameter of 2-6 μm (the solid content weight of the coating resin is assumed as 100 parts by weight) is used as an intermediate coating composition, a multi-layered coating film having an excellent finish appearance and chipping resistance can be formed.

BACKGROUND ART DOCUMENT

Patent Document

Patent Document 1: JP-A-10-216617
Patent Document 1: JP-A-2003-211085

SUMMARY OF THE INVENTION

Problem that the Invention is to Solve

However, even in the processes for forming a coating film described in Patent Documents 1 and 2, multi-layered coating films with sufficient smoothness and chipping resistance could sometimes not be obtained. Therefore, an object of the present invention is to provide a process for formation of a multi-layered coating film which is capable of forming a coating film having excellent smoothness and chipping resistance in accordance with the 3C1B process.

Means for Solving the Problem

The inventors has made intensive studies in order to achieve the aforementioned object. As a result, it was found that in the coating steps of a multi-layered coating film in accordance with the 3C1B process, in a case where an organic solvent-based coating composition containing a polyester resin containing a hydroxyl group with a specific structure, hydroxyl group value, and number-average molecular weight along with a melamine resin is used as a first colored coating composition and when an organic solvent-based coating composition containing an acrylic resin containing a hydroxyl group with a specific hydroxyl group value and weight-average molecular weight, a melamine resin having a specific structure, and an acid catalyst is used as a second colored coating composition, a multi-layered coating film having excellent smoothness and chipping resistance can be formed, leading to the completion of the present invention.

The present invention provides a process for formation of a multi-layered coating film and an article where a multi-layered coating film is formed by the process for formation of a multi-layered coating film.

1. A process for formation of a multi-layered coating film, which sequentially comprises the following steps (1)-(4):

(1) a step of coating an organic solvent-based first colored coating composition (A) on an object to be coated to form an uncured first colored coating film, (2) a step of coating an organic solvent-based second colored coating composition (B) on the uncured first colored coating film formed in the step (1) to form an uncured second colored coating film, (3) a step of coating a clear coating composition (C) on the uncured second colored coating film formed in the step (2) to form a clear coating film, and (4) a step of heating the uncured first colored coating film, the uncured second colored coating film and the uncured clear coating film formed in the steps (1)-(3) to cure these three films simultaneously;

wherein the organic solvent-based first colored coating composition (A) is a coating composition containing (a1) a polyester resin containing a hydroxyl group, which contains 1.0-8.0 mol/kg (resin solid content) of a straight-chain alkylene group having a carbon number of 4 or more in the molecule, has a hydroxyl group value in a range of 30-160 mgKOH/g and has a number-average molecular weight in a range of 1,000-6,000, and (a2) a melamine resin; and the organic solvent-based second colored coating composition (B) is a coating composition containing (b1) an acrylic resin containing a hydroxyl group, which has a hydroxyl group value in a range of 40-200 mgKOH/g and has a weight-average molecular weight in a range of 3,000-15,000, (b2) a melamine resin having a content rate of a mononuclear melamine of 40 mass % or more, and (b3) an acid catalyst.

2. The process for formation of a multi-layered coating film according to item 1 above, wherein the melamine resin (a2) has a content rate of a mononuclear melamine of less than 40 mass %.

3. The process for formation of a multi-layered coating film according to item 1 or 2 above, wherein the melamine resin (a2) is a melamine resin having at least one of an imino group and a methylol group.

4. The process for formation of a multi-layered coating film according to any one of items 1 to 3 above, wherein the organic solvent-based first colored coating composition (A) contains 30-90 parts by mass of the polyester resin (a1) containing a hydroxyl group and 10-70 parts by mass of the melamine resin (a2) based on 100 parts by mass of a total solid content of the polyester resin (a1) containing a hydroxyl group and the melamine resin (a2).

5. The process for formation of a multi-layered coating film according to any one of items 1 to 4 above, wherein the acid catalyst (b3) is a sulfonic acid catalyst.

6. The process for formation of a multi-layered coating film according to any one of items 1 to 5 above, wherein the organic solvent-based second colored coating composition (B) contains 30-95 parts by mass of the acrylic resin (b1) containing a hydroxyl group, 5-70 parts by mass of the melamine resin (b2), and 0.1-5 parts by mass of the acid catalyst (b3) based on 100 parts by mass of a total solid content of the acrylic resin (b1) containing a hydroxyl group and the melamine resin (b2).

7. The process for formation of a multi-layered coating film according to any one of items 1 to 6 above, wherein at least one of the organic solvent-based first colored coating composition (A) and the organic solvent-based second colored coating composition (B) contains a flat pigment.

8. The process for formation of a multi-layered coating film according to any one of items 1 to 7 above, wherein the organic solvent-based second colored coating composition (B) has a solid content in a range of 20-80 mass %.

9. An article coated by the process for formation of a multi-layered coating film according to any one of items 1 to 8 above.

Advantage of the Invention

According to the coating film formation process of the present invention, in accordance with the three-coat and one-bake process including sequentially coating a first colored coating composition, a second colored coating composition, and a clear coating composition on an object to be coated and simultaneously heating and curing the obtained multi-layered coating film of these three layers, a multi-layered coating film having excellent smoothness, chipping resistance, and water resistance can be formed.

In addition, when the aforementioned second colored coating composition contains an effect pigment (luster pigment), a multi-layered coating film having an excellent appearance with high flip-flop property and little metallic irregularity can be formed.

MODE FOR CARRYING OUT THE INVENTION

Next, the process for forming a multi-layered coating film according to the present invention will be explained in further detail.

(Step (1))

In the step (1) of the process for forming a multi-layered coating film according to the present invention, an organic solvent-based first colored coating composition (A) containing (a1) a polyester resin containing a hydroxyl group, which contains 1.0-8.0 mol/kg (resin solid content) of a straight-chain alkylene group having a carbon number of 4 or more in the molecule, has a hydroxyl group value in the range of 30-160 mgKOH/g and has a number-average molecular weight in the range of 1,000-6,000, and (a2) a melamine resin is coated on an object to be coated to form an uncured first colored coating film.

<Polyester Resin Containing a Hydroxyl Group (a1)>

The polyester resin (a1) containing a hydroxyl group is a hydroxyl group-containing polyester resin, which includes 1.0-8.0 mol/kg (resin solid content) of a straight-chain alkylene group having a carbon number of 4 or more in the molecule, has a hydroxyl group value in the range of 30-160 mgKOH/g and has a number-average molecular weight in the range of 1,000-6,000.

Usually, the polyester resin (a1) containing a hydroxyl group can be prepared by an esterification reaction or trans-esterification reaction of an acid component (a1-1) and an alcohol component (a1-2).

As the aforementioned acid component (a1-1), compounds that are ordinarily used as an acid component in the preparation of a polyester resin can be used. As the acid component (a1-1), for example, an aliphatic polybasic acid (a1-1-1), alicyclic polybasic acid (a1-1-2), aromatic polybasic acid (a1-1-3), etc., can be mentioned.

The aforementioned aliphatic polybasic acid (a1-1-1) is generally an aliphatic compound having two or more carboxyl groups in one molecule, an acid anhydride of the aliphatic compound, or an esterified product of the aliphatic compound.

As the aforementioned aliphatic polybasic acid (a1-1-1), for example, aliphatic polyvalent carboxylic acids such as butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid (brassylic acid), hexadecanedioic acid, and octadecanedioic acid; anhydrides of these aliphatic polyvalent carboxylic acids; lower alkyl esterified products of these aliphatic polyvalent carboxylic acids, etc., can be mentioned. These substances can be used alone or in combinations of two types or more thereof.

As the aforementioned aliphatic polybasic acid (a1-1-1), aliphatic dicarboxylic acids having a straight-chain alkylene group with the number of carbons in the range of preferably 4 or more, more preferably 4-18, and further preferably 6-U are appropriate in terms of smoothness, image sharpness, water resistance, and chipping resistance of the coating film to be obtained.

As the aforementioned aliphatic dicarboxylic acid having a straight-chain alkylene group with a carbon number of 4 or more, for example, hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid (brassylic acid), hexadecanedioic acid, and octadecanedioic acid; anhydrides of these aliphatic dicarboxylic acids; lower alkyl esterified products of these aliphatic dicarboxylic acids, etc., can be mentioned. These substances can be used alone or in combinations of two types or more thereof.

The aforementioned alicyclic polybasic acid (a1-1-2) is generally a compound having one or more alicyclic structures (mainly 4- to 6-membered rings) and two or more carboxyl groups in one molecule, an acid anhydride of the compound, or an esterified product of the compound.

As the aforementioned alicyclic polybasic acid (a1-1-2), for example, aliphatic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, and 1,3,5-cyclohexanetricarboxylic acid; anhydrides of these aliphatic polyvalent carboxylic acids; lower alkyl esterified products of these alicyclic polyvalent carboxylic acids, etc., can be mentioned. These substances can be used alone or in combinations of two types or more thereof.

The aforementioned aromatic polybasic acid (a1-1-3) is generally an aromatic compound having two or more carboxyl groups in one molecule, an acid anhydride of the aromatic compound, or an esterified product of the aromatic compound.

As the aforementioned aromatic polybasic acid (a1-1-3), for example, aromatic polycarboxylic acids such as phthalic acid, isophthalic acid, terephthalic acid, napthalenedicarboxylic acid, 4,4'-biphenyldicarboxylic acid, trimellitic acid, and pyromellitic acid; anhydrides of these aromatic polyvalent carboxylic acids; lower alkyl esterified products of these aromatic polyvalent carboxylic acids, etc., can be mentioned. These substances can be used alone or in combinations of two types or more thereof.

As the aromatic polybasic acid (a1-1-3), especially, phthalic acid, phthalic anhydride, isophthalic acid, trimellitic acid, and trimellitic anhydride are preferable.

As the acid component (a1-1) other than the aforementioned aliphatic polybasic acid (a1-1-1), alicyclic polybasic acid (a1-1-2) and aromatic polybasic acid (a1-1-3), for example, fatty acids such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; hydroxycarboxylic acids such as lactic acid, citric acid, 3-hydroxybutanoic acid, and 3-hydroxy-4-ethoxybenzoic acid, etc., can be mentioned. These substances can be used alone or in combinations of two types or more thereof.

As the aforementioned alcohol component (a1-2), a polyhydric alcohol having two or more hydroxyl groups in one molecule can be appropriately used.

As the aforementioned polyhydric alcohol, for example, aliphatic diol (a1-2-1), alicyclic diol (a1-2-2), and aromatic diol (a1-2-3) can be mentioned.

The aforementioned aliphatic diol (a1-2-1) is generally an aliphatic compound having two hydroxyl groups in one molecule.

As the aforementioned aliphatic diol (a1-2-1), for example, ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, 1,9-nonanediol, 1,10-decanediol, 1,12-dodecanediol, neopentyl glycol, etc., can be mentioned.

As the aforementioned aliphatic diol (a1-2-1), aliphatic diols having a straight-chain alkylene group with the number of carbons in the range of preferably 4 or more, more preferably 4-12, and further preferably 6-10 are appropriate in terms of smoothness, image sharpness, chipping resistance, etc., of the coating film to be obtained.

As the aforementioned aliphatic diols having a straight-chain alkylene group with a carbon number of 4 or more, for example, 1,4-butanediol, 1,5-pentanediol, 1,6-hexanediol, 1,7-heptanediol, 1,8-octanediol, 1,9-nonanediol, etc., can be mentioned. These substances can be used alone or in combinations of two types or more thereof.

The aforementioned alicyclic diol (a1-2-2) is a compound having one or more alicyclic structures (mainly 4- to 6-membered rings) and two hydroxyl groups in one molecule.

As the aforementioned alicyclic diol (a1-2-2), for example, a divalent alcohol such as 1,4-cyclohexanedimethanol, tricyclodecanedimethanol, hydrogenated bisphenol A, and hydrogenated bisphenol F; polylactonediol in which a lactone such as ε-caprolactone is added to the divalent alcohol, etc., can be mentioned. These substances can be used alone or in combinations of two types or more thereof.

The aforementioned aromatic diol (a1-2-3) is generally an aromatic compound having two hydroxyl groups in one molecule.

As the aforementioned aromatic diol (a1-2-3), for example, ester diols such as bis(hydroxyethyl)terephthalate; alkylene oxide adduct of bisphenol A, etc., can be mentioned. These substances can be used alone or in combinations of two types or more thereof.

As the polyhydric alcohol other than the aforementioned aliphatic diol (a1-2-1), alicyclic diol (a1-2-2) and aromatic diol (a1-2-3), polyether diols such as polyethylene glycol, polypropylene glycol, and polybutylene glycol; trivalent or higher alcohols such as glycerin, trimethylolethane, trimethylolpropane, diglycerin, triglycerin, 1,2,6-hexanetriol, pentaerythritol, dipentaerythritol, tris(2-hydroxyethyl)isocyanurate, sorbitol, and mannite; polylactone polyols in which a lactone such as ε-caprolactone is added to the trivalent or higher alcohol, etc., can be mentioned.

In addition, as the alcohol component (a1-2) other than the aforementioned polyhydric alcohol, for example, a monoalcohol such as methanol, ethanol, propyl alcohol, butyl alcohol, stearyl alcohol, and 2-phenoxyethanol; alcohol compounds obtained by reacting a monoepoxy compound such as propylene oxide, butylenes oxide, and the glycidyl ester of a synthetic highly branched saturated fatty acid (trade name "Cardura E10," made by HEXION Specialty Chemicals Co.) with an acid, etc., can be mentioned.

The content of the straight-chain alkylene group with a carbon number of 4 or more in the molecule of the polyester resin (a1) containing a hydroxyl group is 1.0-8.0 mol/kg (resin solid content), more preferably 2-7 mol/kg, and further preferably 3-6 mol/kg.

The number of carbons of the aforementioned straight-chain alkylene group is 4 or more. In particular, the number of carbons is in the range of preferably 4-12, more preferably 6-10, in view of chipping resistance of the multi-layered coating film to be formed.

The aforementioned polyester resin containing a hydroxyl group, which includes a straight-chain alkylene group with a carbon number of 4 or more in the molecule, for example, can be prepared by using the aforementioned aliphatic dicarboxylic acid having a straight-chain alkylene group with a carbon number of 4 or more as the acid component (a1-1) or using the aforementioned aliphatic diol having a straight-chain alkylene group with a carbon number of 4 or more as the alcohol component (a1-2).

Here, in the present invention, "the content of the straight-chain alkylene group with a carbon number of 4 or more" in the molecule of the polyester resin (a1) containing a hydroxyl group is the number of moles of the straight-chain alkylene with a carbon number of 4 or more included in 1 kg (solid content) of the polyester resin (a1) containing a hydroxyl group. It can be calculated by dividing the total number of moles (Wm) of a monomer having a straight-chain alkylene group with a carbon number of 4 or more, which is included in monomers used in the synthesis of the polyester resin (a1) containing a hydroxyl group, by the generated resin mass except for condensed water (Wr: units kg) (that is, Wm/Wr).

"The content of the straight-chain alkylene group with a carbon number of 4 or more" in the molecule of the aforementioned polyester resin (a1) containing a hydroxyl group, for example, may be adjusted by regulating the mixture ratio of the aliphatic dicarboxylic acid having a straight-chain alkylene group with a carbon number of 4 or more and the aliphatic diol having a straight-chain alkylene group with a carbon number of 4 or more in the aforementioned acid component (a1-1) and alcohol component (a1-2).

The preparation of the polyester resin (a1) containing a hydroxyl group is not particularly limited but can be carried out according to ordinary methods. For example, a method of carrying out an esterification reaction or transesterification reaction by reacting the aforementioned acid component (a1-1) and alcohol component (a1-2) at 150-250° C. for 5-10 hours in a nitrogen gas flow can be mentioned.

In the aforementioned esterification reaction or transesterification reaction, the acid component (a1-1) and the alcohol component (a1-2) may be added at once or may be added in smaller amounts several times. In addition, after a polyester resin containing a carboxyl group is synthesized first, the polyester resin containing a carboxyl group may be esterified by using the alcohol component (a1-2). Moreover, after the polyester resin (a1) containing a hydroxyl group is synthesized first, the polyester resin containing a hydroxyl group may be half-esterified by reacting it with an acid anhydride.

During the aforementioned esterification reaction or transesterification reaction, a catalyst may be used to accelerate the reaction. As the catalyst, for example, known catalysts such as dibutyl tin oxide, antimony trioxide, zinc acetate, manganese acetate, cobalt acetate, calcium acetate, lead acetate, tetrabutyl titanate, and tetraisopropyl titanate can be mentioned.

In addition, the aforementioned polyester resin (a1) containing a hydroxyl group can be modified with a fatty acid, monoepoxy compound, polyisocyanate compound, etc., during the preparation of the resin or after the esterification reaction or transesterification reaction.

As the aforementioned fatty acid, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, etc., can be mentioned.

As the aforementioned monoepoxy compound, for example, the glycidyl ester of a synthetic highly branched saturated fatty acid (trade name "Cardura E10," made by HEXION Specialty Chemicals Co.) may be suitably mentioned.

As the aforementioned polyisocyanate compound, for example, aliphatic diisocyanates such as lysine diisocyanate, hexamethylene diisocyanate, and trimethylhexane diisocyanate; alicyclic diisocyanates such as hydrogenated xylylene diisocyanate, isophorone diisocyanate, methylcyclohexane-2,4-diisocyanate, methylcyclohexane-2,6-diisocyanate, 4,4'-methylene bis(cyclohexyl isocyanate), and 1,3-(isocyanatomethyl)cyclohexane; aromatic diisocyanates such as tolylene diisocyanate, xylylene diisocyanate, and diphenylmethane diisocyanate; organic polyisocyanates themselves such as trivalent or higher polyisocyanates such as lysine triisocyanate or adducts of these respective polyisocyanates with polyhydric alcohols, low-molecular-weight polyester resins or water, or cyclic polymers (for example, isocyanurate) of the aforementioned respective organic isocyanates, biuret type adducts, etc., can be mentioned. These substances can be used alone or in combinations of two types or more thereof.

The hydroxyl group value of the polyester resin (a1) containing a hydroxyl group is in the range of 30-160 mgKOH/g. In particular, the hydroxyl group value is in the range of preferably 30-100 mgKOH/g, more preferably 40-80 mgKOH/g in terms of chipping resistance and water resistance of the multi-layered coating film to be formed.

In addition, the number-average molecular weight of the polyester resin (a1) containing a hydroxyl group is in the range of 1,000-6,000. In particular, the number-average molecular weight is in the range of preferably 2,000-6,000, more preferably 2,500-5,000 in terms of smoothness and chipping resistance of the multi-layered coating film to be formed.

The adjustment of the hydroxyl group value, the number-average molecular weight, and the acid value of the polyester resin (a1) containing a hydroxyl group can be made, for example, by adjusting the equivalent ratio (COOH/OH) of the carboxyl group of the aforementioned acid component (a1-1) and the hydroxyl group of the aforementioned alcohol component (a1-2), as well as by adjusting the reaction time in the aforementioned esterification reaction or transesterification reaction.

The equivalent ratio (COOH/OH) of the carboxyl group of the aforementioned acid component (a1-1) and the hydroxyl group of the aforementioned alcohol component (a1-2) is generally in the range of preferably 0.80-1.0, more preferably 0.85-1.0, and further preferably 0.90-1.0.

Here, in this specification, the number-average molecular weight and the weight-average molecular weight are values calculated based on the molecular weight of a standard polystyrene from the number-average molecular weight and the weight-average molecular weight measured by using a gel permeation chromatograph (GPC).

Specifically, using "HLC8120GPC" (trade name, made by Tosoh Corporation) as the gel permeation chromatograph and four pieces of "TSKgel G-4000HXL," "TSKgel G-3000HXL," "TSKgel G-2500HXL," and "TSKgel G-2000HXL" (trade name, all of these columns are made by Tosoh Corporation) as columns, the number-average molecular weight and the weight-average molecular weight can be measured under the conditions of a mobile phase: tetrahydrofuran, measurement temperature: 40° C., flow velocity: 1 mL/min, and detector: R1.

<Melamine Resin (a2)>

As the melamine resin (a2), for example, a partial or completely methylolated melamine resin, which is obtained by the reaction of melamine and aldehyde, can be mentioned. As the aldehyde, for example, formaldehyde, paraformaldehyde, acetaldehyde, and benzaldehyde can be mentioned. Among them, formaldehyde is preferable.

In the reaction of the aforementioned melamine and formaldehyde, usually, a mononuclear melamine in which one melamine is methylolated and a multinuclear melamine in which two or more melamines are coupled by formaldehyde are generated.

In addition, an alkyl etherified melamine resin in which a methylol group of the aforementioned partial or completely methylolated melamine resin is partially or completely etherified by an appropriate alcohol can also be used.

As the alcohol that is used in the etherification, for example, methyl alcohol, ethyl alcohol, n-propyl alcohol, iso-propyl alcohol, n-butyl alcohol, iso-butyl alcohol, 2-ethyl-1-butanol, 2-ethyl-1-hexanol, etc., can be mentioned.

Among them, in the melamine resin (a2), the content rate of the mononuclear melamine is preferably less than 40 mass %, more preferably less than 35 mass %, and further preferably less than 30 mass % in terms of the smoothness and chipping resistance of the multi-layered coating film to be obtained.

The content rate of the mononuclear melamine of the melamine resin (a2) can be adjusted, for example, by changing the reaction conditions of the aforementioned melamine and formaldehyde. In addition, the content rate of the mononuclear melamine can be confirmed by measuring the content of the mononuclear melamine and the multinuclear melamine, for example, of the reaction product of the aforementioned melamine and formaldehyde, by using a gel permeation chromatograph.

Moreover, the melamine resin (a2) is preferably a melamine resin having at least one of an imino group and a methylol group in terms of smoothness and chipping resistance of the multi-layered coating film to be obtained. The melamine resin having at least one of an imino group and a methylol group can be obtained, for example, by partially etherifying the methylol group of the aforementioned partial or completely methylolated melamine resin by the aforementioned alcohol.

As the alcohol that is used in the aforementioned etherification, in terms of water resistance of the multi-layered coating film to be obtained, methyl alcohol, n-butyl alcohol, and iso-butyl alcohol are preferable; n-butyl alcohol and iso-butyl alcohol are more preferable.

In addition, the weight-average molecular weight of the melamine resin (a2) is preferably 400-6,000, more preferably 500-4,000, and further preferably 600-2,000.

As the melamine resin (a2), commercial products can be used. As the commercial products, for example, "CYMEL 202," "CYMEL 203," "CYMEL 204," "CYMEL 211," "CYMEL 238," "CYMEL 251," "CYMEL 303," "CYMEL 323," "CYMEL 324," "CYMEL 325," "CYMEL 327," "CYMEL 350," "CYMEL 385," "CYMEL 1156," "CYMEL 1158," "CYMEL 1116," and "CYMEL 1130" (all made by Nihon Cytec Industries Inc.), "U-VAN 120," "U-VAN 20HS," "U-VAN 20SE60," "U-VAN 2021," "U-VAN 2028," and "U-VAN 28-60" (hereto, made by Mitsui Chemicals, Inc.), etc., can be mentioned.

<Organic Solvent-Based First Colored Coating Composition (A)>

The organic solvent-based first colored coating composition (A), which is used in the process for forming a multi-layered coating film according to the present invention, is an organic solvent-based coating composition containing the aforementioned polyester resin (a1) containing a hydroxyl group and melamine resin (a2). In this specification, an organic solvent-based coating composition, when compared with an water-based coating composition, is a coating composition containing substantially no water as a solvent.

The mixture ratio of the polyester resin (a1) containing a hydroxyl group and the melamine resin (a2) in the organic solvent-based first colored coating composition (A) is preferably in the following range based on 100 parts by mass of the total solid content of the polyester resin (a1) containing a hydroxyl group and the melamine resin (a2). With the control of the mixture ratio within this range, a coating film with excellent chipping resistance can be formed.

Polyester resin (a1) containing a hydroxyl group: preferably 30-90 parts by mass, more preferably 35-85 parts by mass, and further preferably 45-75 parts by mass.

Melamine resin (a2): preferably 10-70 parts by mass, more preferably 15-65 parts by mass, and further preferably 25-55 parts by mass.

The organic solvent-based first colored coating composition (A) can include a resin for modification in addition to the polyester resin (a1) containing a hydroxyl group. As the resin for modification, for example, an acrylic resin, polyurethane resin, alkyd resin, silicon resin, fluorine resin, epoxy resin, etc., can be mentioned. In particular, it is preferable to include at least one of an acrylic resin and a polyurethane resin in terms of smoothness and chipping resistance of the coating film to be obtained.

When the organic solvent-based first colored coating composition (A) includes the resin for modification, the incorporation amount of the resin for modification is generally in the range of preferably 1-50 parts by mass, more preferably 3-35 parts by mass, and further preferably 5-20 parts by mass based on 100 parts by mass of the total solid content of the polyester resin (a1) containing a hydroxyl group and the melamine resin (a2) in the organic solvent-based first colored coating composition (A).

In addition, the organic solvent-based first colored coating composition (A) can include a curing agent other than the melamine resin (a2). As the curing agent, for example, a polyisocyanate compound, blocked polyisocyanate compound, compound containing a carbodiimide group, etc., can be mentioned.

Moreover, it is preferable for the organic solvent-based first colored coating composition (A) to include a curing catalyst in terms of the chipping resistance, smoothness, and water resistance of the multi-layered coating film to be formed. As the curing catalyst, for example, a sulfonic acid such as para-toluenesulfonic acid, dodecylbenzenesulfonic acid, and dinonylnaphthalenesulfonic acid; alkylphosphoric acid ester such as monobutylphosphoric acid, dibutylphosphoric acid, mono-2-ethylhexylphosphoric acid, and di-2-ethylhexy-lphosphoric acid; salts of these acids and amine compounds, etc., can be mentioned.

When the organic solvent-based first colored coating composition (A) includes the aforementioned curing catalyst, the incorporation amount of the curing catalyst is generally in the range of preferably 0.1-5 parts by mass, more preferably 0.3-3 parts by mass, and further preferably 0.5-2 parts by mass based on 100 parts by mass of the total solid content of the polyester resin (a1) containing a hydroxyl group and the melamine resin (a2) in the organic solvent-based first colored coating composition (A).

In addition, it is more preferable for the organic solvent-based first colored coating composition (A) to include a pigment. As the pigment, for example, color pigments (tinting pigments), extender pigments (body pigments), effect pigments, etc., can be mentioned. These pigments can be used alone or in combinations of two types or more thereof.

When the organic solvent-based first colored coating composition (A) includes the aforementioned pigment, the incorporation amount of the pigment is generally in the range of preferably 1-200 parts by mass, more preferably 5-150 parts by mass, and further preferably 10-120 parts by mass based on 100 parts by mass of the total solid content of the polyester resin (a1) containing a hydroxyl group and the melamine resin (a2) in the organic solvent-based first colored coating composition (A).

As the aforementioned color pigment, for example, titanium oxide, zinc white, carbon black, molybdenum red, Prussian blue, cobalt blue, azo pigment, phthalocyanine pigment, quinacridone pigment, isoindoline pigment, indanthrene pigment, perylene pigment, dioxazine pigment, diketopyrrolopyrrole pigment, etc., can be mentioned. Among them, titanium oxide and carbon black are preferable.

When the organic solvent-based first colored coating composition (A) includes the aforementioned color pigment, the incorporation amount of the color pigment is usually in the range of preferably 1-180 parts by mass, more preferably 3-160 parts by mass, and further preferably 5-140 parts by mass based on 100 parts by mass of the total solid content of the polyester resin (a1) containing a hydroxyl group and the melamine resin (a2) in the organic solvent-based first colored coating composition (A).

In addition, as the extender pigments, for example, talc, clay, kaolin, barium sulfate, barium carbonate, calcium carbonate, silica, alumina white, etc., can be mentioned.

When the organic solvent-based first colored coating composition (A) includes the aforementioned extender pigment, the incorporation amount of the extender pigment is usually in the range of preferably 1-150 parts by mass, more preferably 5-130 parts by mass, and further preferably 10-110 parts by mass based on 100 parts by mass of the total solid content of the polyester resin (a1) containing a hydroxyl group and the melamine resin (a2) in the organic solvent-based first colored coating composition (A).

Moreover, as the aforementioned effect pigment, for example, aluminum (including vapor-deposited aluminum), copper, zinc, brass, nickel, aluminum oxide, mica, aluminum oxide coated with titanium oxide or iron oxide, mica coated with titanium oxide or iron oxide, glass flakes, hologram pigment, etc., can be mentioned. These effect pigments can be used alone or in combinations of two types or more thereof. As the aluminum pigment, there are non-leafing type aluminum and leafing type aluminum, and either of them can be used.

When the organic solvent-based first colored coating composition (A) includes the aforementioned effect pigment, the incorporation amount of the effect pigment is usually in the range of preferably 1-50 parts by mass, more preferably 2-30 parts by mass, and further preferably 3-20 parts by mass based on 100 parts by mass of the total solid content of the polyester resin (a1) containing a hydroxyl group and the melamine resin (a2) in the organic solvent-based first colored coating composition (A).

Furthermore, it is preferable for the organic solvent-based first colored coating composition (A) to include a flat pigment (plate-like pigment) in terms of the chipping resistance of the multi-layered coating film to be obtained. As the flat pigment, for example, talc, aluminum oxide, mica, aluminum oxide coated with titanium oxide or iron oxide, mica coated with titanium oxide or iron oxide, etc., can be used. Among them, talc is preferably used.

When the organic solvent-based first colored coating composition (A) includes the aforementioned flat pigment, the incorporation amount of the flat pigment is generally in the range of preferably 0.5-20 parts by mass, more preferably 1-15 parts by mass, and further preferably 3-12 parts by mass based on 100 parts by mass of the total solid content of the polyester resin (a1) containing a hydroxyl group and the melamine resin (a2) in the organic solvent-based first colored coating composition (A).

The aforementioned organic solvent-based first colored coating composition (A) may be coated on the aforementioned object to be coated by known methods such as air spray, airless spray, and rotary atomizing coater. During the coating, electrostatic application may be applied. In particular, electrostatic coating using an air spray and electrostatic coating using a rotary atomizing coater are preferable, with electrostatic coating using a rotary atomizing coater being especially preferable.

The coating film thickness is usually in the range of preferably 10-100 μm, more preferably 10-50 μm, and further preferably 15-35 μm as the cured film thickness.

Regarding the coating film of the organic solvent-based first colored coating composition (A) coated, the solid content ratio of the coating film can be adjusted by a preheating (preheat) means, air blowing means, etc., before coating the organic solvent-based second colored coating composition (B), but it is preferable not to apply the preheating, air blowing, etc. after coating the organic solvent-based first colored coating composition (A), in terms of energy-saving.

The process for forming a multi-layered coating film according to the present invention has an advantage in which a multi-layered coating film with excellent smoothness can be formed even without applying the aforementioned preheating.

In this specification, a cured film is a film in a cured and dried state prescribed in JIS K 5600-1-1, that is, in a state in which the coated surface is not dented with a fingerprint and the motion of the film is not observed even by strongly sandwiching the center of the coated surface with a thumb and an index finger, and with no trace of a fingerprint appearing on the coated surface even by rapidly and repeatedly rubbing the center of the coated surface with a finger tip. On the other hand, an uncured film is a film in a state in which the film does not reach the aforementioned cured and dried state, including a dry-to-touch state and a semi-cured and dried state prescribed in JIS K 5600-1-1.

(Step (2))

In the step (2) of the process for formation of a multi-layered coating film according to the present invention, the organic solvent-based second colored coating composition (B) containing (b1) an acrylic resin containing a hydroxyl group, which has a hydroxyl group value of 40-200 mgKOH/g and has a weight-average molecular weight of 3,000-15,000, (b2) a melamine resin having a content rate of a mononuclear melamine of 40 mass % or more, and (b3) an acid catalyst is coated on an uncured first colored coating film formed in the aforementioned step (1), so that an uncured second colored coating film is formed.

<Acrylic Resin (b1) Containing a Hydroxyl Group>

The acrylic resin (b1) containing a hydroxyl group is an acrylic resin containing a hydroxyl group with a hydroxyl group value of 40-200 mgKOH/g and a weight-average molecular weight of 3,000-15,000.

Usually, the acrylic resin (b1) containing a hydroxyl group can be prepared, for example, by copolymerizing a polymerizable unsaturated monomer containing a hydroxyl group and other polymerizable unsaturated monomers that are copolymerizable with the polymerizable unsaturated monomer containing a hydroxyl group by a known method such as the solution polymerization method in an organic solvent.

The aforementioned polymerizable unsaturated monomer containing a hydroxyl group is a compound respectively having one or more hydroxyl groups and one or more polymerization unsaturated bonds in one molecule. As the polymerizable unsaturated monomer containing a hydroxyl group, for example, monoesterified products of (meth)acrylic acid such as 2-hydroxyethyl(meth)acrylate, 2-hydroxypropyl(meth)acrylate, 3-hydroxypropyl(meth)acrylate, and 4-hydroxybutyl(meth)acrylate with a divalent alcohol having a carbon number of 2-8; ε-caprolactone modified products of these monoesterified products; N-hydroxymethyl(meth)acrylamide; allyl alcohol; (meth)acrylate having a polyoxyethylene chain in which the molecular terminal is a hydroxyl group, etc., can be mentioned.

As the other polymerizable unsaturated monomers that are copolymerizable with the aforementioned polymerizable unsaturated monomer containing a hydroxyl group, for example, an alkyl or cycloalkyl(meth)acrylate such as methyl (meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, "Isostearyl Acrylate" (trade name, made by Osaka Organic Chemical Industry Ltd.), cyclohexyl(meth)acrylate, methylcyclohexyl(meth)acrylate, t-butylcyclohexyl(meth)acrylate, and cyclododecyl(meth)acrylate; polymerizable unsaturated monomers having an isobornyl group such as isobornyl(meth)acrylate; polymerizable unsaturated monomers having an adamantyl group such as adamantyl(meth)acrylate; vinyl aromatic compounds such as styrene, α-methylstyrene, and vinyl toluene; polymerizable unsaturated monomers having an alkoxysilyl group such as vinyl trimethoxysilane, vinyl triethoxysilane, vinyl tris(2-methoxyethoxy)silane, γ-(meth)acryloyloxypropyl trimethoxysilane, and γ-(meth)acryloyloxypropyl triethoxysilane; perfluoroalkyl(meth)acrylates such as perfluorobutylethyl(meth)acrylate and perfluorooctylethyl(meth)acrylate; polymerizable unsaturated monomers having a photopolymerizable functional group such as a maleimide group; vinyl compounds such as N-vinylpyrrolidone, ethylene, butadiene, chloroprene, vinyl propionate, and vinyl acetate; polymerizable unsaturated monomers containing a carboxyl group such as (meth)acrylic acid, maleic acid, crotonic acid, and β-carboxyethyl acrylate; polymerizable unsaturated monomers containing nitrogen such as (meth)acrylonitrile, (meth)acrylamide, N,N-dimethylaminoethyl(meth)acrylate, N,N-dimethylaminopropyl(meth)acrylamide, and amine adducts of glycidyl(meth)acrylate; polymerizable unsaturated monomers having two or more polymerizable unsaturated groups in one molecule such as allyl(meth)acrylate and 1,6-hexanediol(meth)acrylate; polymerizable unsaturated monomers containing an epoxy group such as glycidyl (meth)acrylate, β-methyl glycidyl(meth)acrylate, 3,4-epoxycyclohexylmethyl(meth)arylate, 3,4-epoxycyclohexylethyl(meth)acrylate, 3,4-epoxycyclohexylpropyl(meth)acrylate, and allyl glycidyl ether; (meth)acrylate having a polyoxyethylene chain in which the molecular terminal is an alkoxy group; polymerizable unsaturated monomer having a sulfonic acid group such as 2-acrylamide-2-methylpropanesulfonic acid, allylsulfonic acid, styrenesulfonic acid, and sulfoethyl methacrylate; sodium salts or ammonium salts of polymerizable saturated monomers having these sulfonic acid groups; polymerizable unsaturated monomers containing a phosphoric acid group such as 2-acryloyloxyethyl acid phosphate, 2-methacryloyloxyethyl acid phosphate, 2-acryloyloxypropyl acid phosphate, and 2-methacryloyloxypropyl acid phosphate; polymerizable saturated monomers having an ultraviolet-light-absorbable functional group such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyoxy-2-hdyroxypropoxy)benzophenone, and 2-(2'-hydroxy-5'-methacryloyloxyethylphenyl)-2H-benzotriazole; ultraviolet-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiridine; polymerizable unsaturated monomers having a carbonyl group such as acrolein, diacetone acrylamide, diacetone methacrylamide, acetoacetoxyethyl methacrylate, formylstyrol, and vinyl alkyl ketone (for example, vinyl methyl ketone, vinyl ethyl ketone, and vinyl butyl ketone) with 4-7 carbon atoms; polymerizable unsaturated monomers having a cationic functional group such as a tertiary amino group and quaternary ammonium base, etc., can be mentioned. These polymerizable unsaturated monomers can be used alone or in combinations of two types or more thereof.

The hydroxyl group value of the acrylic resin (b1) containing a hydroxyl group is in the range of 40-200 mgKOH/g. In particular, the hydroxyl group value is in the range of preferably 60-180 mgKOH/g, more preferably 70-150 mgKOH/g in terms of chipping resistance and the water resistance of the multi-layered coating film to be formed.

In addition, in terms of the water resistance of the multi-layered coating film to be formed, the hydroxyl group value of the aforementioned acrylic resin (b1) containing a hydroxyl group is preferably higher than the hydroxyl group value of the aforementioned polyester resin (a1) containing a hydroxyl group. In particular, the ratio of the hydroxyl group value of the polyester resin (a1) containing a hydroxyl group and the hydroxyl group value of the acrylic resin (b1) containing a hydroxyl group is in the range of preferably 1/1.1 to 1/5, more preferably 1/1.2 to 1/4, and further preferably 1/1.5 to 1/3 as the ratio of the former/the latter.

Moreover, the weight-average molecular weight of the acrylic resin (b1) containing a hydroxyl group is in the range of 3,000-15,000. In particular, the number average molecular weight is in the range of preferably 3,500-12,000, further preferably 4,000-8,000 in terms of smoothness and chipping resistance of the multi-layered coating film to be formed.

<Melamine Resin (b2)>

The melamine resin (b2) is a melamine resin in which the content rate of the mononuclear melamine is 40 mass % or more. Among the aforementioned melamine resin (a2), a melamine resin in which the content rate of the mononuclear melamine is 40 mass % or more can be used as the melamine resin (b2).

The content rate of the aforementioned mononuclear melamine can be adjusted, for example, by changing the reaction conditions of the aforementioned melamine and formaldehyde. In addition, the content rate of the mononuclear melamine can be confirmed by measuring the content of the mononuclear melamine and the multinuclear melamine, for example, of the reaction product of the aforementioned melamine and formaldehyde, by using a gel permeation chromatograph.

In particular, the content rate of the mononuclear melamine of the melamine resin (b2) is in the range of preferably 45-90 mass %, more preferably 50-80 mass % in terms of smoothness of the multi-layered coating film to be obtained.

The content rate of the mononuclear melamine of the aforementioned melamine resin (b2) can be adjusted, for example, by reacting the aforementioned melamine and formaldehyde, subsequently sampling the reaction product containing a mononuclear melamine and a multinuclear melamine using a gel permeation chromatography, and fluctuating the mixture ratio of the mononuclear melamine and the multinuclear melamine.

In addition, the weight-average molecular weight of the aforementioned melamine resin (b2) is preferably 400-2,000, more preferably 500-1,500, and further preferably 600-1,000 in terms of smoothness of the multi-layered coating film to be obtained.

<Acid Catalyst (b3)>

As the acid catalyst (b3), for example, sulfonic acids such as paratoluenesulfonic acid, dodecylbenzenesulfonic acid, and dinonylnaphthalenesulfonic acid; alkylphosphoric acid ester such as that of monobutylphosphoric acid, dibutylphosphoric acid, mono-2-ethylhexylphosphoric acid, and di-2-ethylhexylphosphoric acid; salts of these acids and amine compounds, etc., can be used. In particular, the sulfonic acid-based catalyst is preferable in terms of smoothness of the multi-layered coating film to be obtained.

As the aforementioned sulfonic acid-based catalyst, sulfonic acids such as paratoluenesulfonic acid, dodecylbenzenesulfonic acid, and dinonylnaphthalenesulfonic acid and salts of the sulfonic acids and amine compounds can be mentioned.

<Organic Solvent-Based Second Colored Coating Composition (B)>

The organic solvent-based second colored coating composition (B), which is used in the process for forming a multi-layered coating film according to the present invention, is an organic solvent-based coating composition containing the aforementioned acrylic resin (b1) containing a hydroxyl group, melamine resin (b2), and acid catalyst (b3).

The mixture ratio of the acrylic resin (b1) containing a hydroxyl group, the melamine resin (b2), and the acid catalyst (b3) in the organic solvent-based coloring coating (B) is preferably in the following range based on 100 parts by mass of the total solid content of the acrylic resin (b1) containing a hydroxyl group and the melamine resin (b2). A coating film with excellent smoothness can be formed by setting the mixture ratio within that range.

Acrylic resin (b1) containing a hydroxyl group: preferably 30-95 parts by mass, more preferably 35-85 parts by mass, and further preferably 45-75 parts by mass.

Melamine resin (b2): preferably 5-70 parts by mass, more preferably 15-65 parts by mass, and further preferably 25-55 parts by mass.

Acid catalyst (b3): preferably 0.1-5 parts by mass, more preferably 0.3-3 parts by mass, and further preferably 0.5-2 parts by mass.

The organic solvent-based second colored coating composition (B) can include a resin for modification in addition to the acrylic resin (b1) containing a hydroxyl group. As the resin for modification, for example, a polyester resin, polyurethane resin, alkyd resin, silicon resin, fluorine resin, epoxy resin, etc., can be mentioned. In particular, at least one of the polyester resin and the polyurethane resin is preferably included in terms of smoothness and chipping resistance of the coating film to be obtained.

When the organic solvent-based second colored coating composition (B) includes the aforementioned resin for modification, the incorporation amount of the resin for modification is generally in the range of preferably 1-50 parts by mass, more preferably 3-35 parts by mass, and further preferably 5-20 parts by mass based on 100 parts by mass of the total solid content of the acrylic resin (b1) containing a hydroxyl group and the melamine resin (b2) in the organic solvent-based second colored coating composition (B).

In addition, the organic solvent-based second colored coating composition (B) can include a curing agent other than the melamine resin (b2). As the curing agent, for example, a polyisocyanate compound, blocked polyisocyanate compound, compound containing a carbodiimide group, etc., can be used.

Moreover, it is preferable for the organic solvent-based second colored coating composition (B) to further include a pigment. As the pigment, for example, color pigments, extender pigments, and effect pigments can be mentioned. These pigments can be used alone or in combinations of two types or more thereof.

When the organic solvent-based second colored coating composition (B) includes the aforementioned pigment, the incorporation amount of the pigment is generally in the range of preferably 1-200 parts by mass, more preferably 5-150 parts by mass, and further preferably 10-120 parts by mass based on 100 parts by mass of the total solid content of the acrylic resin (b1) containing a hydroxyl group and the melamine resin (b2) in the organic solvent-based second colored coating composition (B).

As the aforementioned color pigment, for example, titanium oxide, white zinc, carbon black, molybdenum red, Prussian blue, cobalt blue, azo pigment, phthalocyanine pigment, quinacridone pigment, isoindoline pigment, indanthrene pigment, perylene pigment, dioxazine pigment, diketopyrrolopyrrole pigment, etc., can be mentioned.

When the organic solvent-based second colored coating composition (B) includes the aforementioned color pigment, the incorporation amount of the color pigment is usually in the range of preferably 1-180 parts by mass, more preferably 3-160 parts by mass, and further preferably 5-140 parts by mass based on 100 parts by mass of the total solid content of the acrylic resin (b1) containing a hydroxyl group and the melamine resin (b2) in the organic solvent-based second colored coating composition (B).

Furthermore, as the aforementioned extender pigment, for example, clay, kaolin, barium sulfate, barium carbonate, calcium carbonate, talc, silica, alumina white, etc., can be mentioned.

When the organic solvent-based second colored coating composition (B) includes the aforementioned extender pigment, the incorporation amount of the extender pigment is usually in the range of preferably 1-180 parts by mass, more preferably 3-160 parts by mass, and further preferably 5-140 parts by mass based on 100 parts by mass of the total solid content of the acrylic resin (b1) containing a hydroxyl group and the melamine resin (b2) in the organic solvent-based second colored coating composition (B).

In addition, as the aforementioned effect pigment, for example, aluminum (including vapor-deposited aluminum), copper, zinc, brass, nickel, aluminum oxide, mica, aluminum oxide coated with titanium oxide or iron oxide, mica coated with titanium oxide or iron oxide, glass flakes, hologram pigment, etc., can be mentioned. These effect pigments can be used alone or in combinations of two types or more thereof.

As the aluminum pigment, there are non-leafing type aluminum and leafing type aluminum, and either of them can be used. Among them, aluminum, aluminum oxide, mica, aluminum oxide coated with titanium oxide or iron oxide, and mica coated with titanium oxide or iron oxide are preferable; aluminum is especially preferable.

When the organic solvent-based second colored coating composition (B) includes the aforementioned effect pigment, the incorporation amount of the effect pigment is usually in the range of preferably 1-100 parts by mass, more preferably 2-50 parts by mass, and further preferably 3-30 parts by mass based on 100 parts by mass of the total solid content of the acrylic resin (b1) containing a hydroxyl group and the melamine resin (b2) in the organic solvent-based second colored coating composition (B).

Moreover, it is preferable for the organic solvent-based second colored coating composition (B) to further include a flat pigment in terms of chipping resistance of the multi-layered coating film to be obtained. As the flat pigment, for example, talc, aluminum oxide, mica, aluminum oxide coated with titanium oxide or iron oxide, mica coated with titanium oxide or iron oxide, etc., can be used. Among them, talc is preferably used.

When the organic solvent-based second colored coating composition (B) includes the aforementioned flat pigment, the incorporation amount of the flat pigment is generally in the range of preferably 0.5-20 parts by mass, more preferably 1-15 parts by mass, and further preferably 3-12 parts by mass based on 100 parts by mass of the total solid content of the acrylic resin (b1) containing a hydroxyl group and the melamine resin (b2) in the organic solvent-based second colored coating composition (B).

The solid content of the organic solvent-based second colored coating composition (B) is in the range of preferably 20-80 mass %, more preferably 30-70 mass %, and further preferably 40-60 mass % in terms of smoothness of the coating film to be obtained.

The organic solvent-based second colored coating composition (B) mentioned above can be coated on the coating film of the organic solvent-based first colored coating composition (A) by known methods such as air spray, airless spray, and rotary atomizing coater. During the coating, an electrostatic application may be applied. In particular, electrostatic coating using an air spray and electrostatic coating using a rotary atomizing coater are preferable; electrostatic coating using a rotary atomizing coater is especially preferable.

The coating film thickness is usually in the range of preferably 5-80 μm, more preferably 6-50 μm, and further preferably 10-35 μm as the cured film thickness.

Regarding the coating film of the organic solvent-based second colored coating composition (B) coated, the solid content ratio of the coating film can be adjusted by a preheating (preheat) means, air blowing means, etc., before coating the clear coating composition (C), but it is preferable not to apply the preheating, air blowing, etc. after coating the organic solvent-based second colored coating composition (B), in terms of energy-saving.

The process for forming a multi-layered coating film according to the present invention has an advantage in which a multi-layered coating film with excellent smoothness can be formed even without applying the aforementioned preheating.

By the process for forming a multi-layered coating film according to the present invention, a multi-layered coating film with excellent smoothness and chipping resistance can be formed in the three-coat and one-bake process without applying preheating. The reason for this is that since the organic solvent-based first colored coating composition (A) includes the polyester resin (a1) containing a hydroxyl group with a relatively low molecular weight, which includes a straight-chain alkylene group with a carbon number of 4 or more, the smoothness can be improved. In addition, it is presumed that since the organic solvent-based second colored coating composition (B) includes the acrylic resin (b1) containing a hydroxyl group as a resin different from the polyester resin, even if the organic solvent-based second colored coating composition (B) is coated on the first colored coating film in a state where preheating has not been carried out, a mixed layer between the coating films is difficult to be generated, resulting in the formation of a multi-layered coating film with excellent smoothness.

In addition, since the organic solvent-based second colored coating composition (B) includes the melamine resin (b2) with a relatively low molecular weight in which the content rate of the mononuclear melamine is 40 mass % or more, the smoothness can be improved. Moreover, it is presumed that since the acid catalyst (b3) of the organic solvent-based second colored coating composition (B) accelerates the reaction of the polyester resin (a1) containing a hydroxyl group in the organic solvent-based first colored coating composition (A) and the melamine resin (b2) of the organic solvent-based second colored coating composition (B), as well as the reaction of the melamine resin (a2) of the organic solvent-based first colored coating composition (A) and the acrylic resin (b1) containing a hydroxyl group in the organic solvent-based second colored coating composition (B), the adhesion between the coating films can be improved, thus forming a multi-layered coating film with excellent water resistance and chipping resistance.

(Step (3))

In the step (3) of the process for formation of a multi-layered coating film according to the present invention, the clear coating composition (C) is coated on the uncured second colored coating film that is formed by the aforementioned step (2).

As the clear coating composition (C), any of known thermosetting clear coating compositions used for coating an automobile body, etc., can be used. As the thermosetting clear coating compositions, for example, organic solvent-based thermosetting coating compositions, water-based thermosetting coating composition, powder thermosetting coating composition, etc., which contain a base resin having a crosslinking functional group and a crosslinking agent can be mentioned.

As the crosslinking functional group of the aforementioned base resin, for example, a carboxyl group, hydroxyl group, epoxy group, silanol group, etc., can be mentioned.

As the type of base resin, for example, an acrylic resin, polyester resin, alkyd resin, urethane resin, epoxy resin, fluororesin, etc., can be mentioned.

As the aforementioned crosslinking agent, for example, a polyisocyanate compound, blocked polyisocyanate compound, melamine resin, urea resin, compound containing a carboxyl group, resin containing a carboxyl group, resin containing an epoxy group, compound containing an epoxy group, etc., can be mentioned.

As the combination of the base resin/crosslinking agent of the clear coating composition (C), a resin containing a hydroxyl group/polyisocyanate compound, resin containing a hydroxyl group/blocked polyisocyanate compound, resin containing a hydroxyl group/melamine resin, etc., are preferable.

In addition, the aforementioned clear coating composition (C) may be a one-liquid type coating composition or a multi-liquid type coating composition, such as a two-liquid type urethane resin coating composition.

Moreover, in the aforementioned clear coating composition (C), if necessary, color pigments, effect pigments, dyes, etc., may be included to the degree that the transparency is not hindered. Furthermore, an extender pigment, ultraviolet absorbent, optical stabilizer, antifoaming agent, tackifier, antirust agent, surface adjustor, etc., can be appropriately included.

The clear coating composition (C) can be coated on the film of the organic solvent-based second colored coating composition (B) by known methods such as air spray, airless spray, and rotary atomizing coater. During the coating, an electrostatic application may also be applied.

The film thickness of the coating with the clear coating composition (C) is usually in the range of preferably 10-80 μm, more preferably 15-60 and further preferably 20-50 μm as the cured film thickness.

In addition, after coating of the clear coating composition (C), if necessary, it is preferable to leave it for 1-60 min at room temperature or to apply preheating at 40-80° C. for about 1-60 min.

(Step (4))

In the step (4) of the process for the formation of a multi-layered coating film according to the present invention, the uncured first colored coating film, the uncured second colored coating film, and the uncured clear coating film formed in the aforementioned steps (1)-(3) are simultaneously heated and cured.

The aforementioned first colored coating film, second colored coating film, and clear coating film can be cured by an ordinary baking means of a coating film, such as hot-air heating, infrared heating, and high-frequency heating.

The heating temperature is preferably 80-180° C., more preferably 100-170° C., and further preferably 120-160° C.

In addition, the heating time is preferably 10-60 min, more preferably 15-40 min. Owing to this heating, the multi-layered coating film of the first colored coating film, the second colored coating film, and the clear coating film can be simultaneously cured.

(Object to be Coated)

The object to be coated, to which the process of the present invention is applied, is not particularly limited. As the object to be coated, for example, external plate parts of automobile bodies of passenger cars, trucks, motorcycles, and buses; automobile parts such as bumpers; external plate parts of electric home appliances such as portable phones and audio equipment, etc., can be mentioned. Among them, external plate parts of automobile bodies and automobile parts are preferable.

The material of the object to be coated is not particularly limited. For example, metallic materials such as iron, aluminum, brass, copper, tin plate, stainless steel, galvanized steel, and zinc alloy (Zn—Al, Zn—Ni, Zn—Fe, etc.)-plated copper; plastic materials such as polyethylene resin, polypropylene resin, acrylonitrile-butadiene-styrene (ABS) resin, polyamide resin, acrylic resin, vinylidene chloride resin, polycarbonate resin, polyurethane resin, epoxy resin, etc., and mixtures of these resins, as well as various types of fiber-reinforced plastics (FRP); inorganic materials such as glass, cement, and concrete; woods; fiber materials such as papers and fabrics, etc., can be mentioned. Among them, the metallic materials and plastic materials are preferable.

For the object to be coated, a surface treatment such as a phosphate treatment, chromate treatment, and composite oxide treatment may also be applied to the metal surface of the aforementioned metallic materials or vehicle bodies obtained by molding these materials. In addition, a coating film may also be formed thereon.

As the object to be coated subjected to coating film formation, an object in which a base is subjected to a surface treatment as needed and an undercoating film is formed thereon, etc., can be mentioned. Among them, as the undercoating film, an electrodeposited film is preferable; an electrodeposited film using a cationic electrodepositing coating is more preferable.

In addition, the object to be coated may be an aforementioned plastic materials or automobile parts obtained by molding the plastic materials where a surface treatment and a primer coating are applied onto the plastic surface thereof according to the necessity. Moreover, the plastic materials and the aforementioned metallic materials may also be combined.

EXAMPLES

Next, the present invention will be explained in detail by examples and comparative examples. However, the present invention should not be limited to these examples. Here, all the "part" and "%" are based on mass.

Manufacture of Solution of Polyester Resin (a1) Containing a Hydroxyl Group

Manufacture Example 1

In a reaction vessel with a thermometer, thermostat, stirrer, reflux cooler, and water separator, 69 parts (0.45 mol) of 1,2-cyclohexanedicarboxylic anhydride (molecular weight: 154), 86 parts (0.5 mol) of 1,4-cyclohexanedicarboxylic acid (molecular weight: 172), 59 parts (0.5 mol %) of 1,6-hexanediol (molecular weight: 118), 25 parts (0.4 mol) of ethylene glycol, and 13 parts (0.1 mol) of trimethylolpropane (molecular weight: 134) were charged, with the temperature being raised from 160° C. to 230° C. with spending 3 hours. Next, the temperature was held at 230° C. while distilling off the condensed water by the water separator, carrying out the reaction until the acid value reached 6 mgKOH/g. Next, the reaction mixture was diluted to a solid content concentration of 70% by a mixed solvent of xylene/Swasol 1000 (trade name, made by Cosmo Oil Co., Ltd., petroleum type aromatic hydrocarbon solvent) at a mass ratio of 50/50, so that a solution of polyester resin (a1-1) containing a hydroxyl group was obtained. The polyester resin containing a hydroxyl group obtained had a hydroxyl group value of 56 mgKOH/g and a number-average molecular weight of 3,000.

Here, the content of the straight-chain alkylene group with a carbon number of 4 or more in the polyester resin containing a hydroxyl group obtained was determined by the following calculation.

Mole number ($Wm$) of the straight-chain alkylene group with carbon number of 4 or more = 59/118(1,6-hexanediol) = 0.5 [mol]

Mass of condensed water =

$$18 \times \left\{ \begin{array}{c} 1 \times 69/154 \\ (1,2\text{-cyclohexanedicarboxylic anhydride}) + \\ 2 \times 86/172 \\ (1,4\text{-cyclohexanedicarboxylic acid}) \end{array} \right\} = 26.1 \text{ [g]}$$

Mass of generated resin ($Wr$) except for condensed water =
69(1,2-cyclohexanedicarboxylic anhydride) +
86(1,4-cyclohexanedicarboxylic acid) + 59(1,6-hexanediol) +
25(ethylene glycol) + 13(trimethylolpropane) −
26.1(condensed water) = 226.9 [g] = 0.2269 [kg]

Content of straight-chain alkylene group with carbon number of 4 or more = mole number ($Wm$) of straight-chain alkylene group with 4 or more carbons/mass of generated resin ($Wr$) except for condensed water = 0.5/0.2269 ≅ 2.2 [mol/kg (resin solid content)]

Manufacture Examples 2-11

Similarly to Manufacture Example 1, monomers with mixture ratios shown in the following Table 1 were reacted until acid values shown in the following Table 1 were obtained, so that polyester resin solutions (a1-2)-(a1-11) containing a hydroxyl group were obtained. The mixture amount of each monomer, the hydroxyl group value, the acid number, and the number-average molecular weight of each polyester resin containing a hydroxyl group obtained, as well as the content of a straight-chain alkylene group with carbon number of 4 or more, are shown along with the polyester resin solution (a1-1) containing a hydroxyl group obtained in Manufacture Example 1 in the following Table 1.

TABLE 1

| Manufacture Example | | | | 1 | 2 | 3 | 4 | 5 | 6 |
|---|---|---|---|---|---|---|---|---|---|
| Polyester resin (a1) containing a hydroxyl group | | | | a1-1 | a1-2 | a1-3 | a1-4 | a1-5 | a1-6 |
| Acid component (a1-1) | Aliphatic polybasic acid (a1-1-1) | Aliphatic dicarboxylic acid having a straight-chain alkylene group with 4 or more carbons | Adipic acid | | 73 | 110 | 73 | 73 | 73 |
| | | | 1,6-hexanedicarboxylic acid | | | | | | |
| | Alicyclic polybasic acid (a1-1-2) | | 1,2-cyclohexanedicarboxylic anhydride | 69 | 69 | 31 | 77 | 62 | 62 |
| | | | 1,4-cyclohexanedicarboxylic acid | 86 | | | | | |
| | Aromatic polybasic acid (a1-1-3) | | Isophthalic acid | | | | | | |
| Alcohol component (a1-2) | Aliphatic diol (a1-2-1) | Aliphatic diol having a straight-chain alkylene group with 4 or more carbons | 1,4-butanediol | | | | | | 81 |
| | | | 1,6-hexanediol | 59 | 106 | 106 | 106 | 106 | |
| | | | Ethylene glycol | 25 | | | | | |
| | | | Trimethylolpropane | 13 | 13 | 13 | 13 | 27 | 23 |
| Content of straight-chain alkylene group with 4 or more carbons [mol/kg (resin solid content)] | | | | 2.2 | 5.9 | 7.2 | 5.8 | 5.8 | 6.6 |
| Hydroxyl group value [mgKOH/g] | | | | 56 | 55 | 55 | 33 | 145 | 140 |
| Acid value [mgKOH/g] | | | | 6 | 10 | 6 | 6 | 0.5 | 3 |
| Number-average molecular weight | | | | 3,000 | 2,900 | 3,100 | 5,600 | 1,100 | 1,200 |
| Manufacture Example | | | | 7 | 8 | 9 | 10 | 11 | |
| Polyester resin (a1) containing a hydroxyl group | | | | a1-7 | a1-8 | a1-9 | a1-10 | a1-11 | |
| Acid component (a1-1) | Aliphatic polybasic acid (a1-1-1) | Aliphatic dicarboxylic acid having a straight-chain alkylene group with 4 or more carbons | Adipic acid | | 7 | 139 | 73 | 73 | |
| | | | 1,6-hexanedicarboxylic acid | 78 | | | | | |
| | Alicyclic polybasic acid (a1-1-2) | | 1,2-cyclohexanedicarboxylic anhydride | 69 | | | 77 | 54 | |
| | | | 1,4-cyclohexanedicarboxylic acid | | | | | | |
| | Aromatic polybasic acid (a1-1-3) | | Isophthalic acid | | | 149 | | | |
| Alcohol component (a1-2) | Aliphatic diol (a1-2-1) | Aliphatic diol having a straight-chain alkylene group with 4 or more carbons | 1,4-butanediol | | | | | | |
| | | | 1,6-hexanediol | 100 | | 112 | 106 | 106 | |
| | | | Ethylene glycol | | 56 | | | | |
| | | | Trimethylolpropane | 13 | 13 | 7 | 13 | 27 | |
| Content of straight-chain alkylene group with 4 or more carbons [mol/kg (resin solid content)] | | | | 4.7 | 0.3 | 8.5 | 5.8 | 5.9 | |
| Hydroxyl group value [mgKOH/g] | | | | 35 | 64.5 | 43.7 | 28 | 170 | |
| Acid value [mgKOH/g] | | | | 5 | 6 | 6 | 5 | 6 | |
| Number-average molecular weight | | | | 5,600 | 2,700 | 3,000 | 11,000 | 900 | |

Manufacture of Solution of Acrylic Resin (b1) Containing a Hydroxyl Group

Manufacture Example 12

In a reaction vessel with a thermometer, thermostat, stirrer, reflux cooler, nitrogen introducing pipe, and water separator, 15 parts of ethyl-3-ethoxy propionate and 15 parts of n-butyl propionate were charged, then the temperature was raised to 155° C. Next, a monomer mixture composed of 15 parts of styrene, 25 parts of methyl methacrylate, 24 parts of isobornyl acrylate, 25 parts of 2-ethylhexyl acrylate, 11 parts of 2-hydroxyethyl acrylate, and 4.5 parts of 2,2-di(t-amylperoxy) butane (polymerization initiator) was added dropwise with spending 5 hour; after finishing the dropping, the reaction mixture was aged for 2 hours, so that a solution of an acrylic resin (b1-1) containing a hydroxyl group with a solid content of 75% was obtained. The acrylic resin containing a hydroxyl group obtained had a hydroxyl group value of 53 mgKOH/g and a weight-average molecular weight of 5,500.

Manufacture Examples 13-20

Similarly to Manufacture Example 12, monomer mixtures with mixture ratios shown in the following Table 2 were reacted, so that solutions of acrylic resins (b1-2)-(b1-9) containing a hydroxyl group were obtained. The mixture amount of each monomer and the hydroxyl group value and the number-average molecular weight of each acrylic resin containing a hydroxyl group obtained are shown along with the solution of the acrylic resin (b 1-1) containing a hydroxyl group obtained in Manufacture Example 12 in the following Table 2.

Manufacture of Organic Solvent-Based First Colored Coating Composition (A)

Manufacture Example 21

28.6 parts (resin solid content: 20 parts) of the solution of polyester resin (a1-1) containing a hydroxyl group obtained in Manufacture Example 1, 40 parts of "JR-806" (trade name, made by TAYCA, rutile type titanium dioxide), 1.5 parts of "Carbon MA-100" (trade name, made by Mitsubishi Chemical Corporation, carbon black), 4 parts of "MICRO ACE S-3" (trade name, made by Nippon Talc Co., Ltd., talc), and 15 parts of xylene were put into a glass bottle with a wide opening, sealed after adding glass beads, and dispersed for 30 min by a paint shaker. The glass beads were then removed to obtain a pigment-dispersed paste. Next, 89.1 parts of the pigment-dispersed paste obtained, 28.6 parts (resin solid content: 20 parts) of the solution of polyester resin (a1-1) containing a hydroxyl group obtained in Manufacture Example 1, 66.7 parts (resin solid content: 40 parts) of melamine resin (a2-1) (a melamine resin containing a methylol group in which the content rate of a mononuclear melamine is 1%, the weight-average molecular weight is 2,500, and the solid content is 60%), 26.7 parts (resin solid content: 20 parts) of the solution of acrylic resin containing a hydroxyl group obtained in Manufacture Example 13, and 4 parts of "Nacure 5543" (trade name, made by King Industries Inc., amine salt of dodecylbenzenesulfonic acid, effective component: 25%) were uniformly mixed. Next, a mixed solvent of xylene/Swasol 1000 (trade name, made by Cosmo Oil Co., Ltd., petroleum type aromatic hydrocarbon solvent) at a mass ratio of 50/50 was added to the mixture so that a first colored coating composition (A-1) in which the flow time through a Ford viscosity cup No. 4 at 20° C. was 20 sec was obtained.

Manufacture Examples 22-39

According to mixtures shown in Tables 3 and 4, first colored coating compositions (A-2)-(A-19) in which the flow time through a Ford viscosity cup No. 4 at 20° C. was 20 sec were obtained similarly to a method similar to that of Example 21.

TABLE 2

| Manufacture Example | | | 12 | 13 | 14 | 15 | 16 | 17 | 18 | 19 | 20 |
|---|---|---|---|---|---|---|---|---|---|---|---|
| Acrylic resin (b1) containing a hydroxyl group | | | b1-1 | b1-2 | b1-3 | b1-4 | b1-5 | b1-6 | b1-7 | b1-8 | b1-9 |
| Monomer mixture | Polymerizable unsaturated monomer containing a hydroxyl group | 2-hydroxyethyl acrylate | 11 | 20 | 37 | 20 | 20 | 5 | 45 | 20 | 20 |
| | Other polymerizable unsaturated monomers | Styrene | 15 | 10 | 10 | 10 | 10 | 15 | 10 | 10 | 10 |
| | | Methyl methacrylate | 25 | 20 | 15 | 20 | 20 | 30 | 15 | 20 | 20 |
| | | Isobornyl acrylate | 24 | 30 | 20 | 30 | 30 | 15 | 20 | 30 | 30 |
| | | 2-ethylhexyl acrylate | 25 | 20 | 18 | 20 | 20 | 35 | 10 | 20 | 20 |
| | | 2,2-di(t-amylperoxy)butane | 4.5 | 4.5 | 4.5 | 8 | 2 | 4.5 | 4.5 | 9 | 1 |
| Reaction temperature | | | 155 | 155 | 155 | 155 | 155 | 155 | 155 | 155 | 155 |
| Solid content (mass %) | | | 75 | 75 | 75 | 75 | 75 | 75 | 75 | 75 | 75 |
| Hydroxyl group value [mgKOH/g] | | | 53 | 97 | 179 | 97 | 97 | 24 | 217 | 97 | 97 |
| Weight-average molecular weight | | | 5,500 | 5,500 | 5,500 | 3,500 | 14,000 | 5,500 | 5,500 | 2,500 | 16,000 |

TABLE 3

| Manufacture Example | | | | 21 | 22 | 23 | 24 | 25 | 26 | 27 | 28 | 29 | 30 |
|---|---|---|---|---|---|---|---|---|---|---|---|---|---|
| Name of first colored coating composition | | | | A-1 | A-2 | A-3 | A-4 | A-5 | A-6 | A-7 | A-8 | A-9 | A-10 |
| Pigment-dispersed paste | Polyester resin (a1) containing a hydroxyl group | Type | | a1-1 | a1-2 | a1-3 | a1-4 | a1-5 | a1-6 | a1-7 | a1-2 | a1-2 | a1-2 |
| | | Incorporation amount | | 28.6 | 28.6 | 28.6 | 28.6 | 28.6 | 28.6 | 28.6 | 28.6 | 28.6 | 28.6 |
| | Pigment | Color pigment | "JR-806" | 40 | 40 | 40 | 40 | 40 | 40 | 40 | 40 | 40 | 40 |
| | | | "MA-100" | 1.5 | 1.5 | 1.5 | 1.5 | 1.5 | 1.5 | 1.5 | 1.5 | 1.5 | 1.5 |
| | | Flat pigment | "MICRO ACE S-3" | 4 | 4 | 4 | 4 | 4 | 4 | 4 | 4 | 4 | 4 |
| | Xylene | | | 15 | 15 | 15 | 15 | 15 | 15 | 15 | 15 | 15 | 15 |

TABLE 3-continued

| Manufacture Example | | 21 | 22 | 23 | 24 | 25 | 26 | 27 | 28 | 29 | 30 |
|---|---|---|---|---|---|---|---|---|---|---|---|
| Polyester resin (a1) containing a hydroxyl group | Type | a1-1 | a1-2 | a1-3 | a1-4 | a1-5 | a1-6 | a1-7 | a1-2 | a1-2 | a1-2 |
| | Incorporation amount | 28.6 | 28.6 | 28.6 | 28.6 | 28.6 | 28.6 | 28.6 | 28.6 | 28.6 | 28.6 |
| Melamine resin (a2) | Melamine resin (a2-1) | 66.7 | 66.7 | 66.7 | 66.7 | 66.7 | 66.7 | 66.7 | | | |
| | Melamine resin (a2-2) (Note 3) | | | | | | | | 50.0 | | |
| | Melamine resin (a2-3) (Note 4) | | | | | | | | | 50.0 | |
| | Melamine resin (a2-4) (Note 5) | | | | | | | | | | 40.0 |
| Acrylic resin containing a hydroxyl group | Solution of acrylic resin (b1-2) containing a hydroxyl group | 26.7 | 26.7 | 26.7 | 26.7 | 26.7 | 26.7 | 26.7 | 26.7 | 26.7 | 26.7 |
| Curing catalyst | "Nacure 5543" | 4 | 4 | 4 | 4 | 4 | 4 | 4 | 4 | 4 | 4 |

TABLE 4

| Manufacture Example | | | 31 | 32 | 33 | 34 | 35 | 36 | 37 | 38 | 39 |
|---|---|---|---|---|---|---|---|---|---|---|---|
| Name of first colored coating composition | | | A-11 | A-12 | A-13 | A-14 | A-15 | A-16 | A-17 | A-18 | A-19 |
| Pigment-dispersed paste | Polyester resin (a1) containing a hydroxyl group | Type | a1-2 | a1-2 | a1-2 | a1-2 | a1-8 | a1-9 | a1-10 | a1-11 | a1-2 |
| | | Incorporation amount | 28.6 | 28.6 | 28.6 | 28.6 | 28.6 | 28.6 | 28.6 | 28.6 | 28.6 |
| | Pigment  Color pigment | "JR-806" | 40 | 40 | 40 | 40 | 40 | 40 | 40 | 40 | 40 |
| | | "MA-100" | 1.5 | 1.5 | 1.5 | 1.5 | 1.5 | 1.5 | 1.5 | 1.5 | 1.5 |
| | Flat pigment | "MICRO ACE S-3" | 4 | 4 | | | 4 | 4 | 4 | 4 | |
| | | "MK100" (Note 1) | | | | 4 | | | | | |
| | | "TP Clay" (Note 2) | | | 4 | | | | | | |
| | Xylene | | 15 | 15 | 15 | 15 | 15 | 15 | 15 | 15 | 15 |
| Polyester resin (a1) containing a hydroxyl group | Type | | a1-2 | a1-2 | a1-2 | a1-2 | a1-8 | a1-9 | a1-10 | a1-11 | a1-2 |
| | Incorporation amount | | 43.0 | 43.0 | 71.0 | 14.0 | 28.6 | 28.6 | 28.6 | 28.6 | 28.6 |
| Melamine resin (a2) | Melamine resin (a2-1) | | 16.7 | 25.0 | 50.0 | 50.0 | 66.7 | 66.7 | 66.7 | 66.7 | 66.7 |
| Polyisocyanate compound | "Sumidur N3300" (Note 6) | | 20.0 | | | | | | | | |
| Blocked polyisocyanate compound | "Sumidur BL3175" (Note 7) | | | 20.0 | | | | | | | |
| Acrylic resin containing a hydroxyl group | Solution of acrylic resin (b1-2) containing a hydroxyl group | | 26.7 | 26.7 | | 53.4 | 26.7 | 26.7 | 26.7 | 26.7 | 26.7 |
| Curing catalyst | "Nacure 5543" | | 4 | 4 | 4 | | 4 | 4 | 4 | 4 | 4 |

(Note 1)
"MK100": trade name, made by Co-op Chemical Co., Ltd., mica
(Note 2)
"TP Clay": trade name, made by Sanyo Clay Ltd.
(Note 3)
Melamine resin (a2-2): a melamine resin containing an imino group and a methylol group in which the content rate of the mononuclear melamine is 35%, the weight-average molecular weight is 1,200, and the solid content is 80%
(Note 4)
Melamine resin (a2-3): a melamine resin containing an imino group and a methylol group in which the content rate of the mononuclear melamine is 45%, the weight-average molecular weight is 800, and the solid content is 80%
(Note 5)
Melamine resin (a2-4): a melamine resin containing no imino group nor methylol group in which the content rate of the mononuclear melamine is 60%, the weight-average molecular weight is 600, and the solid content is 100%
(Note 6)
"Sumidur N3300": trade name, made by Sumika Bayer Urethane Co., Ltd., isocyanurate of hexamethylene diisocyanate, solid content: 100%, NCO content: 21.8%
(Note 7)
"Sumidur BL3175": trade name, made by Sumika Bayer Urethane Co., Ltd., oxime blocked product of hexamethylene diisocyanate, solid content: 75%, NCO content: 11.2%

Manufacture of Organic Solvent-Based Second Colored Coating Composition (B)

Manufacture Example 40

26.7 parts (resin solid content: 20 parts) of the solution of acrylic resin (b1-2) containing a hydroxyl group obtained in Manufacture Example 13, 4 parts of "MICRO ACE S-3" (trade name, made by Nippon Talc Co., Ltd., talc), and 15 parts of xylene were put into a glass bottle with a wide opening, sealed after adding glass beads, and dispersed for 30 min by a paint shaker. The glass beads were then removed to obtain a pigment-dispersed paste.

Next, 45.7 parts of the pigment-dispersed paste obtained, 66.7 parts of the solution of acrylic resin (b1-2) containing a hydroxyl group obtained in Manufacture Example 13, 30 parts of melamine resin (b2-1) (a melamine resin containing a methylol group in which the content rate of the mononuclear melamine is 65%, the weight-average molecular weight is 900, and the solid content is 100%), 19 parts (resin solid content: 14 parts) of "GX-180A" (trade name, made by Asahi Chemical Metals Ltd., aluminum pigment paste, aluminum content: 74%), and 4 parts of "Nacure 5543" (trade name, made by King Industries Inc., an amine salt of dodecylbenzenesulfonic acid, effective component: 25%) were uniformly mixed.

Next, a mixed solvent of xylene/Swasol 1000 (trade name, made by Cosmo Oil Co., Ltd., petroleum type aromatic hydrocarbon solvent) at a mass ratio of 50/50 was added to the mixture so that a second colored coating composition (B-1) in which the flow time through a Ford viscosity cup No. 4 at 20° C. was 20 sec and in which the solid content was 51 mass % was obtained.

Manufacture Examples 41-56

According to the formulations shown in Tables 5 and 6, second colored coating compositions (B-1)-(B-17) in which the flow time through a Ford viscosity cup No. 4 at 20° C. was 20 sec were obtained similarly to a method similar to that of Manufacture Example 40.

TABLE 5

| Manufacture Example | | | 40 | 41 | 42 | 43 | 44 | 45 | 46 | 47 | 48 |
|---|---|---|---|---|---|---|---|---|---|---|---|
| Name of second colored coating composition | | | B-1 | B-2 | B-3 | B-4 | B-5 | B-6 | B-7 | B-8 | B-9 |
| Pigment-dispersed paste | Acrylic resin (b1) containing a hydroxyl group | Type | b1-2 | b1-1 | b1-1 | a1-3 | a1-4 | a1-4 | a1-5 | b1-2 | b1-2 |
| | | Incorporation amount | 26.7 | 26.7 | 26.7 | 26.7 | 26.7 | 26.7 | 26.7 | 26.7 | 26.7 |
| | Flat pigment | "MICRO ACE S-3" | 4 | 4 | 4 | 4 | 4 | 4 | 4 | 4 | 4 |
| | Xylene | | 15 | 15 | 15 | 15 | 15 | 15 | 15 | 15 | 15 |
| Acrylic resin (b1) containing a hydroxyl group | | Type | b1-2 | b1-1 | b1-1 | a1-3 | a1-4 | a1-4 | a1-5 | b1-2 | b1-2 |
| | | Incorporation amount | 66.7 | 66.7 | 40.0 | 66.7 | 66.7 | 20.0 | 66.7 | 66.7 | 66.7 |
| Melamine resin (b2) | | Melamine resin (b2-1) | 30 | 30 | 35 | 30 | 30 | 30 | 30 | | |
| | | Melamine resin (b2-2) (Note 8) | | | | | | | | 37.5 | |
| | | Melamine resin (b2-3) (Note 9) | | | | | | | | | 37.5 |
| Effect pigment | | "GX-180A" | 19 | 19 | 19 | 19 | 19 | 19 | 19 | 19 | 19 |
| Curing catalyst | | "Nacure 5543" | 4 | 4 | 4 | 4 | 4 | 4 | 4 | 4 | 4 |
| Polyester resin containing a hydroxyl group | | Polyester resin containing a hydroxyl group (a1-2) | | | | 21.4 | | 50 | | | |
| Coating solid content [mass %] | | | 51 | 53 | 55 | 49 | 54 | 56 | 48 | 49 | 47 |

TABLE 6

| Manufacture Example | | | 49 | 50 | 51 | 52 | 53 | 54 | 55 | 56 |
|---|---|---|---|---|---|---|---|---|---|---|
| Name of second colored coating composition | | | B-10 | B-11 | B-12 | B-13 | B-14 | B-15 | B-16 | B-17 |
| Pigment-dispersed paste | Acrylic resin (b1) containing a hydroxyl group | Type | b1-2 | b1-2 | b1-6 | b1-7 | b1-8 | b1-9 | b1-2 | b1-2 |
| | | Incorporation amount | 26.7 | 26.7 | 26.7 | 26.7 | 26.7 | 26.7 | 26.7 | 26.7 |
| | Flat pigment | "MICRO ACE S-3" | 4 | | 4 | 4 | 4 | 4 | 4 | 4 |
| | Xylene | | 15 | 15 | 15 | 15 | 15 | 15 | 15 | 15 |
| Acrylic resin (b1) containing a hydroxyl group | | Type | b1-2 | b1-2 | b1-6 | b1-7 | b1-8 | b1-9 | b1-2 | b1-2 |
| | | Incorporation amount | 66.7 | 66.7 | 66.7 | 66.7 | 66.7 | 66.7 | 66.7 | 66.7 |
| Melamine resin (b2) | | Melamine resin (b2-1) | 30 | 30 | 30 | 30 | 30 | 30 | | 30 |
| Melamine resin (a2-2) (Note 3) | | | | | | | | | 37.5 | |
| Effect pigment | | "GX-180A" | 19.0 | 19.0 | 19.0 | 19 | 19 | 19 | 19 | 19 |
| Curing catalyst | | "Nacure 5543" | | 4 | 4 | 4 | 4 | 4 | 4 | |
| | | "Nacure 4167" (Note 10) | 4 | | | | | | | |
| Coating solid content [mass %] | | | 51 | 51 | 55 | 47 | 56 | 48 | 49 | 51 |

(Note 8)
Melamine resin (b2-2): a melamine resin containing an imino group and a methylol group in which the content rate of the mononuclear melamine is 45%, the weight-average molecular weight is 800, and the solid content is 80%
(Note 9)
Melamine resin (b2-3): a melamine resin containing an imino group and a methylol group in which the content rate of the mononuclear melamine is 55%, the weight-average molecular weight is 800, and the solid content is 80%
(Note 10)
"Nacure 4167" (trade name, made by King Industries Inc., amine salt of alkyl phosphoric acid ester, effective component: 25%)

(Preparation of Test Plate)

Using the first colored coating compositions (A-1)-(A19) obtained in Manufacture Examples 21-39 and the second colored coating compositions (B-1)-(B-17) obtained in the aforementioned Manufacture Examples 40-56, test plates were respectively prepared as follows and subjected to an evaluation test.

(Preparation of Object to be Coated for Testing)

A cationic electrodepositing coating (trade name "Elecron GT-10" made by Kansai Paint Co., Ltd.) was electrodeposited and coated at a cured film thickness of 20 μm on a cold-rolled steel plate, to which a zinc phosphate chemical conversion treatment had been applied, then cured by heating at 170° C. for 30 min, so that an object to be coated for testing was obtained.

Example 1

The organic solvent-based first colored coating composition (A-1) obtained in the aforementioned Manufacture Example 21 was electrostatically coated at a cured film thickness of 25 μm on the aforementioned object to be coated for testing by using a rotary atomization type electrostatic coater and held for 3 min. Next, the organic solvent-based second colored coating composition (B-1) obtained in Manufacture Example 40 was electrostatically coated at a cured film thickness of 15 μm on the uncured first colored coating film by using the rotary atomization type electrostatic coater and held for 5 min.

Next, an organic solvent-based topcoat clear coating composition (trade name "KINO-5071," made by Kansai Paint Co., Ltd., hereinafter, sometimes referred to as "clear coating composition (C-1)") containing an acrylic resin containing a hydroxyl group and a polyisocyanate compound was electrostatically coated at a cured film thickness of 35 μm on the uncured second colored coating film, held for 7 min, and heated at 140° C. for 30 min to simultaneously cure the first colored coating film, the second colored coating film and the clear coating film, so that a test plate was prepared.

Examples 2-25 and Comparative Examples 1-10

Similarly to Example 1 except for changing the first colored coating composition (A-1) obtained in Manufacture Example 21 to any of the first colored coating compositions (A-2)-(A-19) shown in the following Table 5 and changing the second colored coating composition (B-1) obtained in Manufacture Example 40 to any of the second colored coating compositions (B-1)-(B-17) shown in the following Table 5 in Example 1, test plates were prepared.

(Evaluation Test)

Each test plate obtained in the aforementioned Examples 1-25 and Comparative Examples 1-10 was evaluated by the following testing method. The evaluation results are shown in the following Table 7.

(Testing Method)

Smoothness: It was evaluated by using Wb values that were measured by a device with the trade name "Wave Scan DOI" (made by BYK Gardner Co.). It is shown that the smaller the Wb value is, the higher the smoothness of the coated surface is.

Chipping resistance: The test plate was installed on a specimen holding base of a stone scattering tester (trade name "JA-400 Model" made by Suga Test Instruments Co., Ltd.); 50 g of crushed granite stone with a particle size of No. 7 was collided at −20° C. at an angle of 45° with the test plate by compressed air at 0.392 MPa (4 kgf/cm$^2$) from a position separated by 30 cm from the test plate. Next, the test plate obtained was washed with water and dried, then a cloth adhesive tape (Nichiban Co., Ltd.) was pasted on the coated surface. Next, the aforementioned tape was peeled off, then the degree of generation of flaw of the film was evaluated by observing with the naked eye.

⊚: The size of the flaw is very small and the electrodeposited surface or the base steel is not exposed.

O: The size of the flaw is small and the electrodeposited surface or the base steel plate is not exposed.

Δ: The size of the flaw is small, but the electrodeposited surface or the base steel plate is exposed.

X: The size of the flaw is considerably large and the base steel plate is also greatly exposed.

Flip-flop property: Each test plate was observed with the naked eye while changing the angle, then the flip-flop property was evaluated by the following criteria.

⊚: The change of the metallic quality due to the angle through the observation with the naked eye is distinct (very exceptional flip-flop property).

O: The change of the metallic quality due to the angle through the observation with the naked eye is large (excellent flip-flop property).

Δ: The change of the metallic quality due to the angle through the observation with the naked eye is slightly small (slightly inferior flip-flop property)

X: The change of the metallic quality due to the angle through the observation with the naked eye is small (inferior flip-flop property).

Metallic irregularity: Each test plate was observed with the naked eye; the degree of occurrence of metallic irregularities being evaluated by the following criteria.

⊚: Metallic irregularities are slightly observed and a very exceptional coating film appearance is shown.

O: Metallic irregularities are slightly observed; however an excellent coating film appearance is shown.

Δ: Metallic irregularities are observed and the coating film appearance is slightly inferior.

X: Many metallic irregularities are observed and the coating film appearance is inferior.

Water resistance: The test plate was immersed for 240 hours into warm water at 40° C., pulled out, dried at 20° C. for 12 hours, and cut into a grid shape by a cutter so that the multi-layered coating film of the test plate reached the base, with 100 pieces of squares with a size of 2 mm×2 mm being prepared. Next, an adhesive cellophane tape was pasted on that surface and the tape was rapidly peeled off at 20° C. The residual state of the square films was investigated and the water resistance was evaluated by the following criteria.

⊚: 100 pieces of square films remain, with no small edge loss of the films being generated at the edges of the cuts of the cutter.

O: 100 pieces of square films remain; however, a small edge loss of the films is generated at the edges of the cuts of the cutter.

Δ: 90-99 pieces of square films remain.

X: The number of remaining square films is 89 pieces or fewer.

TABLE 7

|  |  | Organic solvent-based first colored coating composition (A) | Organic solvent-based second colored coating composition (B) | Clear coating composition (C) | Chipping resistance | Smoothness | Flip-flop property | Metallic irregularity | Water resistance |
|---|---|---|---|---|---|---|---|---|---|
| Example | 1 | A-1 | B-1 | C-1 | O | 14 | ⊚ | ⊚ | O |
|  | 2 | A-2 | B-1 | C-1 | ⊚ | 15 | ⊚ | ⊚ | ⊚ |
|  | 3 | A-3 | B-1 | C-1 | ⊚ | 18 | ⊚ | ⊚ | ⊚ |
|  | 4 | A-4 | B-1 | C-1 | ⊚ | 17 | ⊚ | ⊚ | ⊚ |
|  | 5 | A-5 | B-1 | C-1 | O | 16 | ⊚ | ⊚ | O |
|  | 6 | A-6 | B-1 | C-1 | O | 19 | ⊚ | ⊚ | ⊚ |
|  | 7 | A-7 | B-1 | C-1 | ⊚ | 16 | ⊚ | ⊚ | O |
|  | 8 | A-8 | B-1 | C-1 | ⊚ | 16 | ⊚ | ⊚ | ⊚ |
|  | 9 | A-9 | B-1 | C-1 | O | 18 | ⊚ | ⊚ | ⊚ |
|  | 10 | A-10 | B-1 | C-1 | O | 16 | ⊚ | ⊚ | ⊚ |
|  | 11 | A-11 | B-1 | C-1 | ⊚ | 15 | ⊚ | ⊚ | ⊚ |
|  | 12 | A-12 | B-1 | C-1 | ⊚ | 18 | ⊚ | ⊚ | ⊚ |
|  | 13 | A-13 | B-1 | C-1 | ⊚ | 17 | ⊚ | ⊚ | ⊚ |
|  | 14 | A-14 | B-1 | C-1 | O | 18 | ⊚ | ⊚ | O |
|  | 15 | A-2 | B-2 | C-1 | O | 15 | ⊚ | ⊚ | O |
|  | 16 | A-2 | B-3 | C-1 | ⊚ | 14 | ⊚ | ⊚ | O |
|  | 17 | A-2 | B-4 | C-1 | ⊚ | 14 | ⊚ | O | O |
|  | 18 | A-2 | B-5 | C-1 | O | 14 | ⊚ | ⊚ | O |
|  | 19 | A-2 | B-6 | C-1 | ⊚ | 15 | ⊚ | ⊚ | O |
|  | 20 | A-2 | B-7 | C-1 | ⊚ | 18 | ⊚ | ⊚ | ⊚ |
|  | 21 | A-2 | B-8 | C-1 | ⊚ | 16 | ⊚ | O | ⊚ |
|  | 22 | A-2 | B-9 | C-1 | ⊚ | 14 | O | O | ⊚ |
|  | 23 | A-2 | B-10 | C-1 | ⊚ | 16 | ⊚ | ⊚ | ⊚ |
|  | 24 | A-2 | B-11 | C-1 | O | 15 | ⊚ | ⊚ | ⊚ |
|  | 25 | A-19 | B-1 | C-1 | O | 16 | ⊚ | ⊚ | ⊚ |

TABLE 7-continued

|  |  | Organic solvent-based first colored coating composition (A) | Organic solvent-based second colored coating composition (B) | Clear coating composition (C) | Chipping resistance | Smoothness | Flip-flop property | Metallic irregularity | Water resistance |
|---|---|---|---|---|---|---|---|---|---|
| Comparative Example | 1 | A-15 | B-1 | C-1 | X | 16 | ◉ | ◉ | Δ |
|  | 2 | A-16 | B-1 | C-1 | ◉ | 22 | ◉ | ◉ | ◉ |
|  | 3 | A-17 | B-1 | C-1 | ◉ | 23 | ◉ | ◉ | ◉ |
|  | 4 | A-18 | B-1 | C-1 | Δ | 17 | ◉ | ◉ | X |
|  | 5 | A-2 | B-12 | C-1 | Δ | 17 | ◉ | Δ | ◉ |
|  | 6 | A-2 | B-13 | C-1 | ◉ | 16 | Δ | ◉ | Δ |
|  | 7 | A-2 | B-14 | C-1 | X | 16 | ◉ | ◉ | Δ |
|  | 8 | A-2 | B-15 | C-1 | ◉ | 25 | Δ | ◉ | ◉ |
|  | 9 | A-2 | B-16 | C-1 | ○ | 22 | ◉ | ◉ | Δ |
|  | 10 | A-2 | B-17 | C-1 | X | 21 | Δ | ○ | X |

As shown in Table 7, according to the process for forming a coating film according to the present invention, it was understood that a multi-layered coating film with excellent smoothness, chipping resistance, and water resistance can be formed in the three-coat and one-bake process that sequentially coats the first colored coating composition, the second colored coating composition, and the clear coating composition on the object to be coated, and simultaneously heats and cures the multi-layered coating film of three layers obtained.

In addition, it was understood that a multi-layered coating film with a high flip-flop property, little metallic irregularity, and excellent appearance can be formed by using the second colored coating composition containing an effect pigment.

While the invention has been described in detail and with reference to specific embodiments thereof, it will be apparent to one skilled in the art that various changes and modifications can be made therein without departing from the scope thereof. This application is based on Japanese patent application No. 2009-225632 filed Sep. 29, 2009, the entire contents thereof being hereby incorporated by reference.

The invention claimed is:

1. A process for formation of a multi-layered coating film, which sequentially comprises the following steps (1)-(4):

(1) a step of coating an organic solvent-based first colored coating composition (A) on an object to be coated to form an uncured first colored coating film, (2) a step of coating an organic solvent-based second colored coating composition (B) on the uncured first colored coating film formed in the step (1) to form an uncured second colored coating film, (3) a step of coating a clear coating composition (C) on the uncured second colored coating film formed in the step (2) to form a clear coating film, and (4) a step of heating the uncured first colored coating film, the uncured second colored coating film and the uncured clear coating film formed in the steps (1)-(3) to cure these three films simultaneously;

wherein the organic solvent-based first colored coating composition (A) is a coating composition containing (a1) a polyester resin containing a hydroxyl group, which contains a straight-chain alkylene group having a carbon number of 4 or more in the molecule in a content of 1.0-8.0 mol per 1 kg of a solid content of the polyester resin (a1), has a hydroxyl group value in a range of 30-160 mgKOH/g and has a number-average molecular weight in a range of 1,000-6,000, and (a2) a melamine resin; and the organic solvent-based second colored coating composition (B) is a coating composition containing (b1) an acrylic resin containing a hydroxyl group, which has a hydroxyl group value in a range of 40-200 mgKOH/g and has a weight-average molecular weight in a range of 3,000-15,000, (b2) a melamine resin having a content rate of a mononuclear melamine of 40 mass % or more, and (b3) an acid catalyst.

2. The process for formation of a multi-layered coating film according to claim 1, wherein the melamine resin (a2) has a content rate of a mononuclear melamine of less than 40 mass %.

3. The process for formation of a multi-layered coating film according to claim 1, wherein the melamine resin (a2) is a melamine resin having at least one of an imino group and a methylol group.

4. The process for formation of a multi-layered coating film according to claim 1, wherein the organic solvent-based first colored coating composition (A) contains 30-90 parts by mass of the polyester resin (a1) containing a hydroxyl group and 10-70 parts by mass of the melamine resin (a2) based on 100 parts by mass of a total solid content of the polyester resin (a1) containing a hydroxyl group and the melamine resin (a2).

5. The process for formation of a multi-layered coating film according to claim 1, wherein the acid catalyst (b3) is a sulfonic acid catalyst.

6. The process for formation of a multi-layered coating film according to claim 1, wherein the organic solvent-based second colored coating composition (B) contains 30-95 parts by mass of the acrylic resin (b1) containing a hydroxyl group, 5-70 parts by mass of the melamine resin (b2), and 0.1-5 parts by mass of the acid catalyst (b3) based on 100 parts by mass of a total solid content of the acrylic resin (b1) containing a hydroxyl group and the melamine resin (b2).

7. The process for formation of a multi-layered coating film according to claim 1, wherein at least one of the organic solvent-based first colored coating composition (A) and the organic solvent-based second colored coating composition (B) contains a flat pigment.

8. The process for formation of a multi-layered coating film according to claim 1, wherein the organic solvent-based second colored coating composition (B) has a solid content in a range of 20-80 mass %.

* * * * *